United States Patent [19]

Gobez et al.

[11] Patent Number: 5,229,568
[45] Date of Patent: Jul. 20, 1993

[54] SPOT RESISTANCE WELDING METHOD AND WELDING ELECTRODE FOR IMPLEMENTING THE METHOD

[75] Inventors: Pascal Gobez, Dunkerque; Eric Thieblemont, Malzeville; Mohamed Bouzekri, Uckange, all of France

[73] Assignee: Sollac, Puteaux, France

[21] Appl. No.: 797,052

[22] Filed: Nov. 25, 1991

[30] Foreign Application Priority Data

Dec. 19, 1990 [FR] France ................................ 90 15946

[51] Int. Cl.$^5$ ............................................. B23K 11/25
[52] U.S. Cl. ................................................... 219/110
[58] Field of Search ..................... 219/109, 110, 86.9, 219/113

[56] References Cited

U.S. PATENT DOCUMENTS

| | | | |
|---|---|---|---|
| 2,045,523 | 6/1936 | Fassler | 219/86.9 |
| 3,089,020 | 5/1963 | Hurlebaus | 219/86.9 |
| 3,436,514 | 4/1969 | Broomhall et al. | 219/113 |
| 3,462,577 | 8/1969 | Helms et al. | 219/110 |
| 4,472,620 | 9/1984 | Nied | 219/110 |
| 4,792,656 | 12/1988 | Namiki et al. | |
| 4,876,430 | 10/1989 | Herschitz et al. | |

FOREIGN PATENT DOCUMENTS

2022290 12/1979 United Kingdom .

OTHER PUBLICATIONS

British Welding Journal, vol. 14, Nov. 1967, pp. 582–591, B. P. Hayward, "Scientific Instrumentation as an Aid to the Control of Resistance Weld Quality".
PT/Werktuigbouw, vol. 43, No. 8, Aug. 1988, pp. 27–31, J. O. Zwolsman, "De Contactweerstand in Het Weerstandlassen".

*Primary Examiner*—Clifford C. Shaw
*Attorney, Agent, or Firm*—Oblon, Spivak, McClelland, Maier & Neustadt

[57] ABSTRACT

The subject of the present invention is a method of spot resistance welding at least two metal pieces (1, 2). The method consists in pressing the pieces (1, 2) between two electrodes (3, 4), in determining the overall resistance between the electrodes (3, 4), and the contact resistances of each electrode (3, 4) with the piece (1, 2) with which it is in contact, in calculating the contact resistance between the said pieces by the difference between the overall resistance and the sum of the resistances of each piece and of the piece-electrode contact resistances, in determining the actual intensity of the electric welding current, and in adjusting the various welding parameters for the said pieces (1, 2) in order to maintain a constant optimal intensity of the electric welding current.

The subject of the present invention is also a welding electrode for implementing the method.

4 Claims, 2 Drawing Sheets

SPOT RESISTANCE WELDING METHOD AND WELDING ELECTRODE FOR IMPLEMENTING THE METHOD

The present invention relates to a spot resistance welding method and a welding electrode for implementing this method.

The thin metal sheets from 0.7 to 2.5 mm in thickness used in particular in the automobile or domestic electrical appliance industries are generally welded together by a spot resistance welding method.

For this purpose, two or more pieces are pressed, with a specified force, between two current intake elements which usually consist of electrodes made of copper or of copper alloy.

On contacting the welding electrodes, the electric current circulates from one electrode to the other, flowing through the said pieces to be welded.

Heating occurs, through the Joule effect, in the pieces to be welded which are inserted between the two electrodes, in particular in the region of contact between the pieces to be welded where the contact resistance is lowest.

This heating of the pieces to be welded in the region of the contact surface makes it possible to melt the metal and create a weld spot after the current has been cut off and the molten core has solidified.

In order to produce perfect welding, the intensity of the electric current circulating between the two electrodes must be calculated correctly.

Indeed, if this intensity is too low, the heating in the pieces to be welded is insufficient to melt the metal and create the molten core required to produce a weld spot.

Similarly, if the intensity of the electric current is too high, the heating in the pieces to be welded is too great and the molten core may burn, thus causing the appearance of oxidised metal in the molten core and consequently in the weld spot which no longer has the desired mechanical characteristics.

Control of the intensity of the electric current in spot resistance welding equipment is effected, either by modifying the voltage in the primary circuit supplying the electrodes, or by changing the winding ratio between the primary circuit and the secondary circuit, or again by controlling the OFF factor of the thyristors with which the electrical circuit is provided.

Usually the current is controlled by increasing or decreasing the OFF factor of the thyristors, this causing, respectively, a decrease or an increase in the effective intensity in the electrical circuit.

As is known, the intensity of the electric current which supplies the electrodes so as to obtain perfect welding depends on a certain number of parameters, namely:
   the resistance of the contact between the first electrode and the corresponding piece,
   the resistance of the first piece,
   the resistance of the contact between the two pieces,
   the resistance of the second piece,
   the resistance of the contact between the second electrode and the corresponding piece,
   the welding time,
   and the force exerted between the two electrodes.

In order to produce optimal welding, it is necessary to know perfectly the contact resistance between the two metal sheets in order to adjust the electric current required to form a perfect molten core, given the welding time and the other parameters.

To this end, before starting large-scale welding, a series of tests is carried out which, through successive trial and error, makes it possible to determine the ideal parameters for the weld.

However, the contact resistances are not constant but vary over time.

Indeed, they decrease for several reasons.

Having produced a certain number of weld spots, the welding electrodes wear away and the contact surfaces increase, making the contact resistance between the pieces and the electrodes decrease, and during welding, the roughness of the pieces decreases owing to the heating and to the progressive melting of the metal, thus increasing the contact surface between the pieces and decreasing their contact resistance.

Moreover, during welding, the pressure forces between the electrodes vary, this making the contact resistances between the pieces and the electrodes vary.

In order to obtain good welding, it is therefore necessary to measure the contact resistances, during welding, so as to adjust the intensity of the welding current.

The aim of the present invention is therefore to propose a welding method in which the intensity of the electric current between the electrodes is adjusted during welding.

The subject of the present invention is a method of spot resistance welding at least two metal pieces, according to which the said pieces are pressed between two electrodes supplied with high-intensity electric welding current by a circuit comprising in particular thyristors, characterized in that, during welding:
   the overall resistance is determined between the electrodes, when the high-intensity electric current flows,
   the contact resistances of each electrode with the piece with which it is in contact are determined,
   the contact resistance between the said pieces is calculated by the difference between the overall resistance and the sum of the resistances of each piece and of the piece-electrode contact resistances,
   the actual intensity of the electric welding current is determined,
   and the various welding parameters for the said pieces are adjusted in order to maintain a constant optimal intensity of the electric welding current.

According to other characteristics of the invention:
   the piece-electrode contact resistances are determined by passing, when the thyristors of the circuit are off, into a first part of each welding electrode, a low-intensity direct current which flows into the piece in contact with the corresponding electrode and emerges into a second part of the corresponding electrode, electrically insulated from the said first part,
   the voltage is measured across the terminals of the two parts of each electrode in order to determine its contact resistance with the corresponding piece,
   the electrodes are supplied with low-intensity direct current every half-cycle of the electric welding current.

The subject of the present invention is also a welding electrode for implementing this method, characterised in that it comprises two separate parts electrically insulated from one another, a first central part surrounded by an electrical insulation which is covered by a second concentric part.

The first part of the electrode is connected to a terminal of an electrical circuit, the other terminal of which is connected to the second part of the said electrode.

The characteristics and advantages of the present invention will emerge in the following description given solely by way of example and made with reference to the attached drawings in which.

Figure 1:
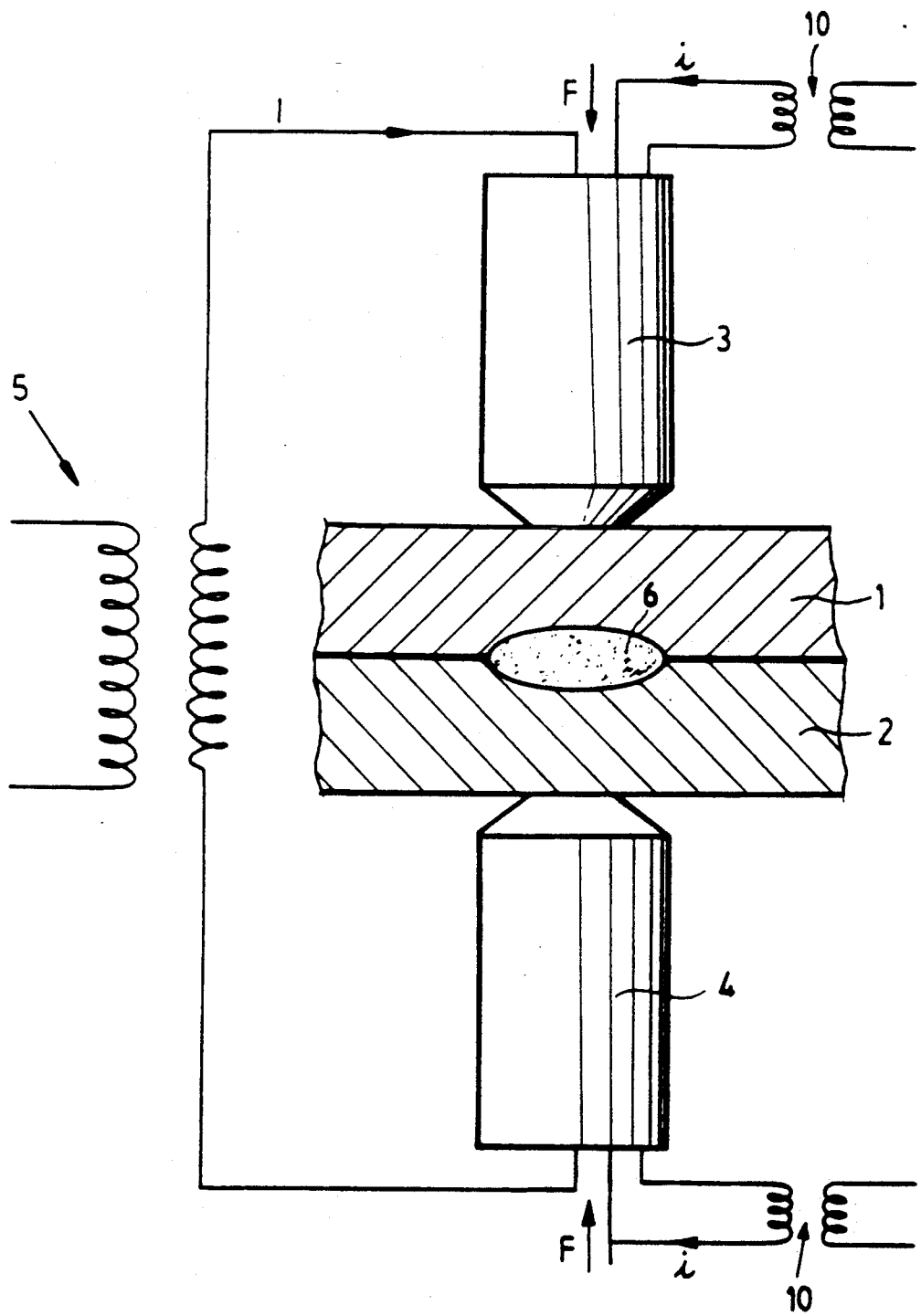
FIG. 1 is a diagrammatic view of the spot resistance welding of two pieces.

In FIG. 1, two metal pieces to be welded have been represented, respectively 1 and 2, which are pressed against one another with a force F between two electrodes, respectively 3 and 4, in which a high-intensity electric welding current I circulates, supplied through a winding 5.

On contacting the electrodes 3 and 4 with the pieces to be welded 1 and 2, the electric current circulates from one electrode to the other, flowing through the said pieces, and produces, by the Joule effect, heating, and there is formed at the interface between the two pieces 1 and 2 in the current flow zone, a molten core 6 which, after cutting-off of the current and cooling, forms a weld spot.

Figure 2:
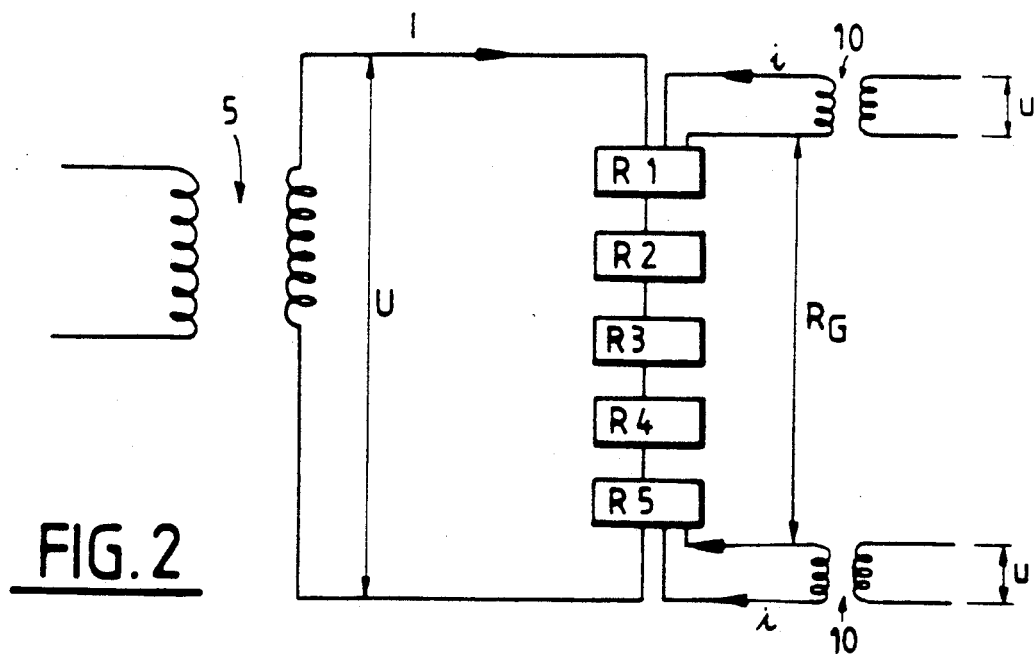
FIG. 2 is a sectional view of a welding electrode according to the invention.

The welding electrode 3 or 4 represented in FIG. 2 is an electrode made of copper or of a copperbased alloy, for example 0.1% zirconium, 1% chrome, and 98.9% copper.

This electrode 3 or 4 consists of a first central cylindrical part 7 which is surrounded by an electrical insulation 8 itself covered by a second part 9 concentric with the said first part.

The first part 7 of the welding electrode 3 is connected to a terminal 10a of an electrical circuit 10, the other terminal 10b of which is connected to the second part 9 of the said electrode.

The same is true for the welding electrode 4.

The circuits 10 are electrical circuits of known type delivering for each electrode 3 or 4 a low-intensity direct current i.

In FIG. 2, the electrical welding circuit has been represented diagrammatically.

According to Ohm's law, $U=RI$ with:

$U$=voltage across the terminals of the electrodes 3 and 4, $RG$=overall resistance across the terminals of the electrodes 3 and 4, $I$=intensity of the welding current.

Knowing the voltage U through measurement, the intensity I of the welding current depends on the resistance RG across the terminals of the electrodes 3 and 4.

Now, this resistance RG across the terminals of the electrodes 3 and 4 breaks down in the following way:
piece 1—electrode 3 contact resistance: R1
resistance of the piece 1: R2
piece 1—piece 2 contact resistance: R3,
resistance of the piece 2: R4,
piece 2—electrode 4 contact resistance: R5.

The elementary resistances R2 and R4, of the pieces 1 and 2 respectively, can be calculated as a function of the geometrical characteristics of the said pieces.

On the other hand, the contact resistances R1, R3 and R5 are unknown and vary during welding.

The welding method, according to the present invention, makes it possible to determine the contact resistances R1 and R5 and thus to calculate R3 in order to obtain the optimal welding intensity and vary the welding parameters, during welding, so as to maintain a constant intensity.

To this end, four steps are undertaken.

In a first step, a high-intensity welding current I corresponding to the desired weld is passed into the electrodes 3 and 4. While the current of intensity I flows, knowing the voltage U in the winding 5, the overall resistance RG between the electrodes 3 and 4 is determined with the aid of Ohm's law.

In a second step, at the instant at which the thyristors, not shown, of the welding circuit are turned off, every half-cycle of the welding current, a low-intensity direct current i is passed into the first part 7 of the electrode 3 and flows into the piece 1 in contact with the electrode 3, emerging into the second part 9 of this electrode 3, electrically insulated from the said first part 7.

Figure 3:
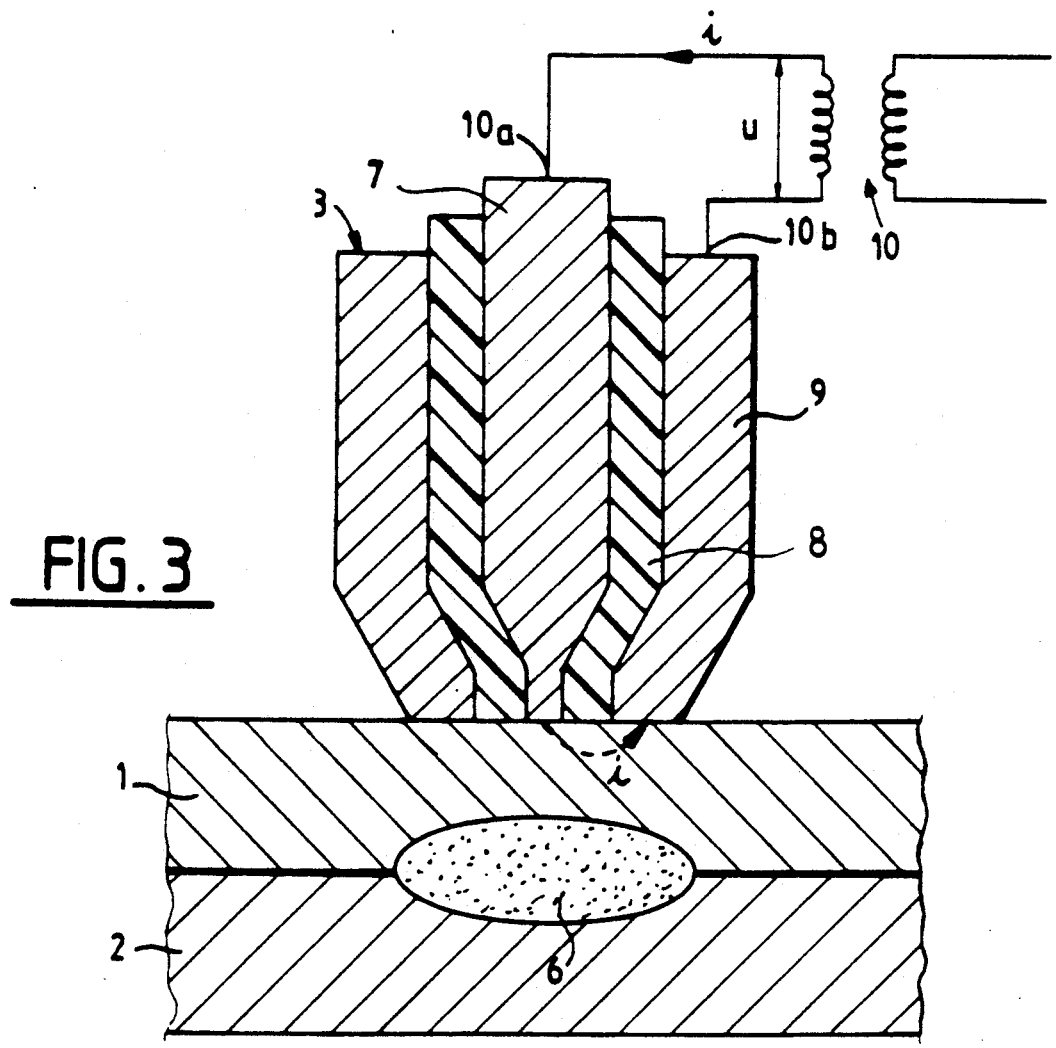
FIG. 3 is a diagrammatic view of the electric welding circuit.

In FIG. 3, the path taken by the low-intensity current i has been shown by a dashed line.

In accordance with Ohm's law, knowing the intensity i, the voltage across the terminals of the two parts 7 and 9 of the electrode 3 is measured, and the piece 1-electrode 3 contact voltage R1 is determined.

A similar process is undertaken in respect of the electrode 4 and the piece 2-electrode 4 contact resistance R5 is thereby determined.

In a third step, the contact resistance R3 between the two pieces 1 and 2 is calculated as follows:

$$R3=RG-R1-R2-R4-R5.$$

Finally, in a last step, the welding parameters, namely either the voltage across the terminals of the electrodes 1 and 2, or the welding time, or the compression force of the said electrodes, are adjusted so as to maintain a constant welding intensity I.

We claim:

1. Method of spot resistance welding at least two metal pieces (1, 2), according to which the said pieces (1, 2) are pressed between two electrodes (3, 4) supplied with high-intensity electric welding current by a circuit comprising thyristors, characterised in that, during welding:

the overall resistance RG is determined between the electrodes (3, 4), when the high-intensity electric current flows, the contact resistances (R1, R5) of each electrode (3, 4) with the piece (1, 2) with which it is in contact are determined, the contact resistance (R3) between the said pieces (1, 2) is calculated by the difference between the overall resistance (RG) and the sum of the resistances (R2, R4) of each piece (1, 2) and of the piece-electrode contact resistances (R1, R5), the actual intensity of the electric welding current is determined, and the various welding parameters for the said pieces (1, 2) are adjusted in order to maintain a constant optimal intensity of the electric welding current.

2. Welding method according to claim 1, characterised in that the piece-electrode contact resistances (R1, R4) are determined by passing, when the thyristors of the circuit are off, into a first part (7) of each welding electrode (3, 4), a low-intensity direct current which flows into the piece (1, 2) in contact with the corresponding electrode (3, 4) and emerges into a second part (9) of the corresponding electrode (3, 4), electrically insulated from the said first part (7).

3. Welding method according to claim 2, characterised in that the voltage is measured across the terminals of the two parts (7, 9) of each electrode (3, 4) in order to determine its contact resistance (Rl, R5) with the corresponding piece (1, 2).

4. Welding method according to claim 2, characterised in that the electrodes (3, 4) are supplied with low-intensity direct current every half-cycle of the electric welding current.

* * * * *